United States Patent [19]

Onotera et al.

[11] 4,375,698

[45] Mar. 1, 1983

[54] APPARATUS FOR TESTING MICROWAVE RADIOS HAVING 35 MHZ IF USING TEST EQUIPMENT DESIGNED FOR 70 MHZ IF

[75] Inventors: Larry Y. Onotera, Surrey; Leonard Dueckman, Maple Ridge, both of Canada

[73] Assignee: AEL Microtel, Ltd., Burnaby, Canada

[21] Appl. No.: 285,223

[22] Filed: Jul. 20, 1981

[51] Int. Cl.³ .......................................... H04B 17/00
[52] U.S. Cl. .......................................... 455/67; 455/9; 179/175.31 R; 324/57 DE
[58] Field of Search ........................ 455/9, 67; 179/175.31 R, 175.3 R; 324/57 DE; 375/10

[56] References Cited

U.S. PATENT DOCUMENTS

| | | | |
|---|---|---|---|
| 3,988,678 | 10/1976 | Hodge | 455/67 |
| 4,025,854 | 5/1977 | Oades | 455/9 |
| 4,317,206 | 2/1982 | Nossen | 455/67 |

Primary Examiner—Jin F. Ng
Attorney, Agent, or Firm—Leonard R. Cool

[57] ABSTRACT

A $70 \pm \Delta f$ MHz sinusoidal test signal from a standard radio link test set is down converted and shaped to obtain a $35 \pm \Delta f/2$ MHz sinusoidal test signal to be applied to the radio set under test. The output of the radio set is applied to an up converter in which a multiplier is used that maintains the amplitude information as it doubles the frequency. The $70 \pm \Delta f$ MHz test signal from the up converter is then applied to the input of the radio link test set, and the characteristic is measured as if the radio set under test employed a 70 MHz IF, rather than a 35 MHz IF.

7 Claims, 3 Drawing Figures

APPARATUS FOR TESTING MICROWAVE RADIOS HAVING 35 MHZ IF USING TEST EQUIPMENT DESIGNED FOR 70 MHZ IF

BACKGROUND OF INVENTION

1. Field of Invention

This invention relates to the testing of microwave radio systems, and in particular to apparatus for converting the test frequency from a 70 MHz IF frequency, normally employed in commercially available radio link test sets, to a 35 MHz IF frequency so that the commercial test set may be used to test radio equipment that operates with a 35 MHz IF.

2. Background of Invention

In the manufacturing, installation and maintenance of microwave radios, it is often necessary to test certain parameters such as amplitude response, group delay response, linearity and return loss under swept frequency conditions. These measurements are most commonly made by using one of the several commercially available test sets such as the GTE Italia CSM 221/C-222C Radio Link Test Set, the Hewlett-Packard 3710/3702 Link Analyzer, and the Siemens K1005/K1046 Sweep Frequency Test Sets.

In order to fully test a microwave radio, the aforementioned parameters must be measured from baseband to baseband, baseband to IF, IF to baseband and IF to IF. In the majority of the radios, the IF is at 70 MHz and thus most commercially available test sets are designed to operate using a 70 MHz IF with a typical bandwidth of ±20 MHz. There are instances, however, when a lower IF frequency such as 35 MHz is desirable, particularly in narrow band radio systems. In such cases, it would be commonly supposed that a simple mixer down converter could be employed between the test set and the input to the radio system and a mixer up converter employed between the output of the radio system and the input of the test set. However, since the 70 MHz is an integral multiple of 35 MHz, a lot of undesired mixing products will appear in the output of both the down converter and the up converter. In addition, the oscillators must be frequency stable in order to maintain a coherent, fixed, frequency relationship. Finally, unless a dual conversion scheme is used, which generates even more spurious products, an inversion in the sense of a sweep signal from the 70 MHz generator is obtained. These disadvantages are overcome by the use of the present invention.

SUMMARY OF INVENTION

Apparatus interposed between a standard radio link test set, which is designed for testing radio sets having an IF centered at a frequency of 70 MHz, and a radio set having an IF centered at 35 MHz, comprises a down converter connected between the output of the test set and the input of the radio set and providing a test signal at the 35 MHz frequency which is substantially free from spurious frequencies; and an up converter which also substantially eliminates spurious frequencies and maintains the amplitude information of the output signal from the radio set as it doubles the frequency.

DETAILED DESCRIPTION OF INVENTION

Figure 1:
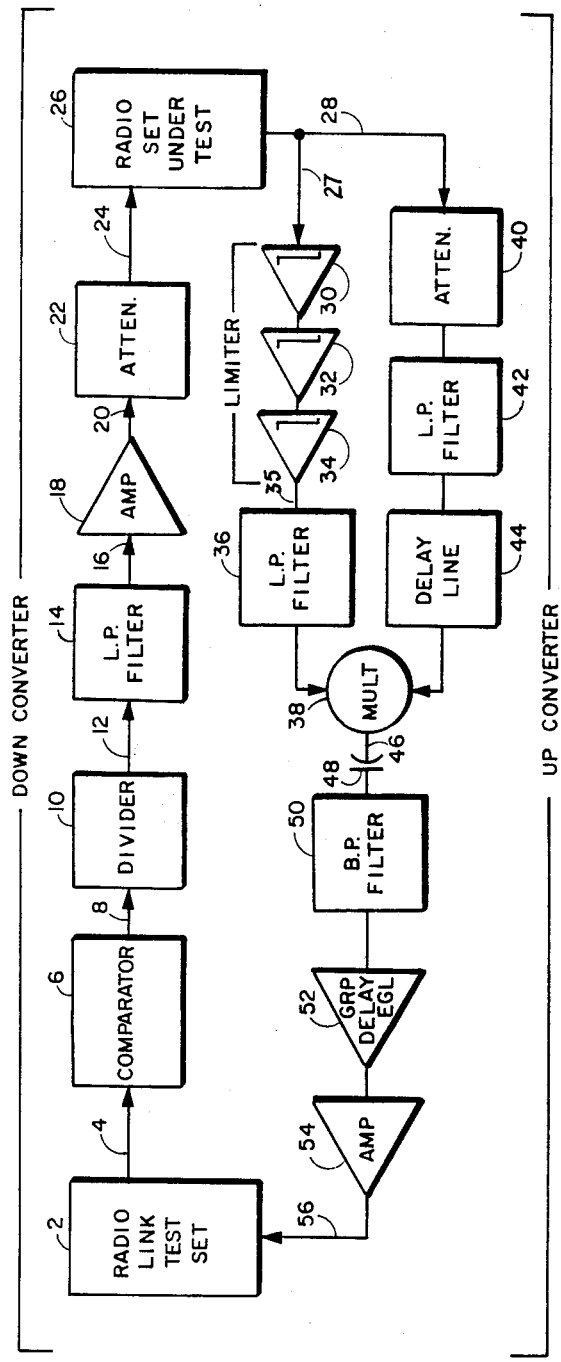
FIG. 1 is a block diagram showing the elements of the up converter and the down converter, which are interposed between the radio link test set (2) and the radio set under test (26)

To obtain the test signal for the radio test set under test, it is necessary to translate the 70±Δf MHz output signal from the radio link test set into a 35 MHz signal with at least the same percentage bandwidth as the original test signal and with a coherent frequency relationship to the original test signal. For this example, it is assumed that IF to IF measurements are being performed, although BB to IF and IF to BB measurements may also be performed using the appropriate conversion. Other requirements for the down conversion process include the fact that the down converter have flat amplitude, group delay and linearity response and contribute relatively low phase jitter. How this is accomplished by the instant invention may be more readily understood by reference to the accompanying drawing in conjunction with the following description.

The 70±Δf MHz output signal from radio link test set 2 is applied via path 4 to comparator 6 to square up the sinusoidal test signal obtained from the radio link test set. Such comparators are well known and one which may be employed is the MC10115 ECL Line Receiver. The squared up waveform is applied via path 8 to divider 10 which may be a conventional flip-flop. The resulting signal at the output from divider 10 is a 35±Δf/2 MHz square wave signal which is then filtered by a low pass filter 14 having a cutoff at approximately 45 MHz. Filter 14 provides the function of eliminating spurious signals from the test signal and shapes the square wave to provide a substantially sinusoidal signal on path 16, which is applied to amplifier 18 to establish the output signal amplitude following the conversion process. The signal is then passed through attenuator 22 which is used to adjust the signal level to that which is required for the appropriate test. Thus, a sinusoidal signal having a center frequency of 35 MHz and a bandwidth appropriate to the test is applied to the IF input of the radio set 26. In order to complete the test, of course, the output signal from the radio set under test must be up converted to provide a signal at the appropriate frequency for utilization by the radio link test set 2.

In translating the 35±Δf/2 MHz signal back to a 70±Δf MHz signal to be used by the test set, it is necessary that the amplitude, group delay and linearity characteristics of the signal from the output of the radio set under test by undistorted by the translation process. The heart of the up converter portion lies in the multiplier section which includes the limiter 30, 32 and 34, low pass filter 36, four-quadrant multiplier 38, attenuator 40, low pass filter 42 and delay line 44.

As is well known, when multiplying a signal by itself, the second harmonic is obtained directly, except for a DC term which may be easily removed and this is done by the means of capacitor 48. It is also known that when a signal is multiplied by itself that the amplitude term is squared and thus such an arrangement would not allow maintenance of the amplitude information as the frequency is doubled. The generalized formula for the output of a multiplier in which the signal is multiplied by itself is as follows:

$$f_o = KE^2 \cos^2 \omega t \qquad (1)$$

$$= \frac{KE^2}{2}(1 + \cos 2\omega t). \qquad (2)$$

K is a constant of proportionality, E is the amplitude of the voltage applied to the multiplier and $\omega$ is the angular frequency. To maintain the amplitude information, one side of the multiplier must be amplitude limited to modify the $E^2$ term so that an E term is obtained. $K_1$ is the constant of proportionality for the amplitude limited signal, $K_2$ is the constant of proportionality for the non-limited signal, $E_1$ is the amplitude of the limited signal and $E_2$ is the amplitude of the non-limited signal. It was learned that this can be accomplished by amplitude limiting in one branch of the input to the multiplier 38 and by so doing the generalized equation becomes:

$$f_o = \frac{K_1 K_2 E_1 E_2}{2}(1 + \cos 2\omega t) \qquad (3)$$

$$\frac{K_1 K_2 E_1}{2} = K' \qquad (4)$$

$$f_o = K' E_2 \cos 2\omega t \qquad (5)$$

Figure 2:
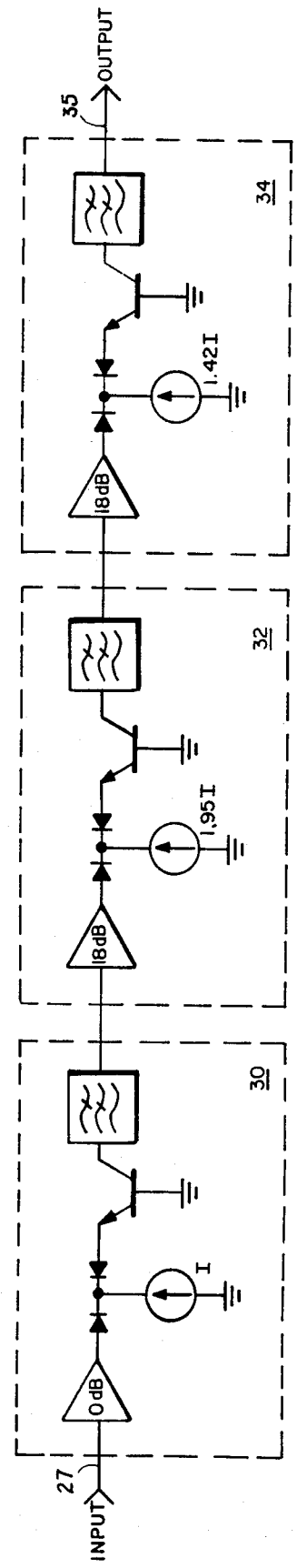
FIG. 2 is a functional schematic of a limiter used in a preferred embodiment of the invention.

The number of stages of limiting will depend upon the dynamic range required. If a dynamic range of 30 dB is required, the limiter, comprising elements 30, 32 and 34 must provide a constant output level for a minimum 30 dB change in input level. Also, in order to maintain the proper amplitude characteristics, the two signals entering the multiplier 38 must maintain their phase relationship. This leads to the requirement of a limiter having a very low AM-PM conversion. In a preferred embodiment of the invention, the limiter section had a maximum deviation of less than 10° for a 30 dB change in input level. The requirements for a limiter having low AM-PM conversion over a 30 dB dynamic range may be met by using three cascaded series limiter sections, internally buffered by amplifier stages each having approximately 18 dB of gain. A zero-gain amplifier provides an input buffer stage. A functional schematic of such a limiter is shown in FIG. 2.

Although there are methods for cancelling AM-PM conversion in limiters through the use of various forms of feedback, these methods are generally effective only over a narrow dynamic range and narrow bandwidth, thereby making such methods undesirable for use in this invention. The method chosen in this case was to minimize the AM-PM contribution as much as was possible and then combine several limiters, in this case three, to obtain an improvement both in limiting performance and AM-PM conversion. In order to minimize AM-PM contributions in the individual limiters, a series limiter arrangement was used in conjunction with microwave type, very low capacitance diodes, such as the HP 5082-2787. In addition, the three limiters were operated at very carefully selected operating points and dynamic operating ranges. Since the phase shift and limiting performance are not linearly related, it is possible to select operating points and dynamic ranges to maximize limiting performance and minimize phase shift contributions. As can be seen in the accompanying diagram FIG. 3, the first limiter operates over the widest dynamic range, but on a portion of the curve where, although the limiting performance is not that good, the relative phase shift does not change greatly. The second limiter operates over a narrower dynamic range but on a portion of the curve which produces better limiting performance. The third limiter operates over an even smaller dynamic range, due to the limiting action of the previous limiters, and consequently it can be operated on an optimum portion of the curve in order to produce a maximum limiting effect. Since the dynamic range is quite small, the change in phase shift resulting from the change in input level will also be minimal.

Figure 3:
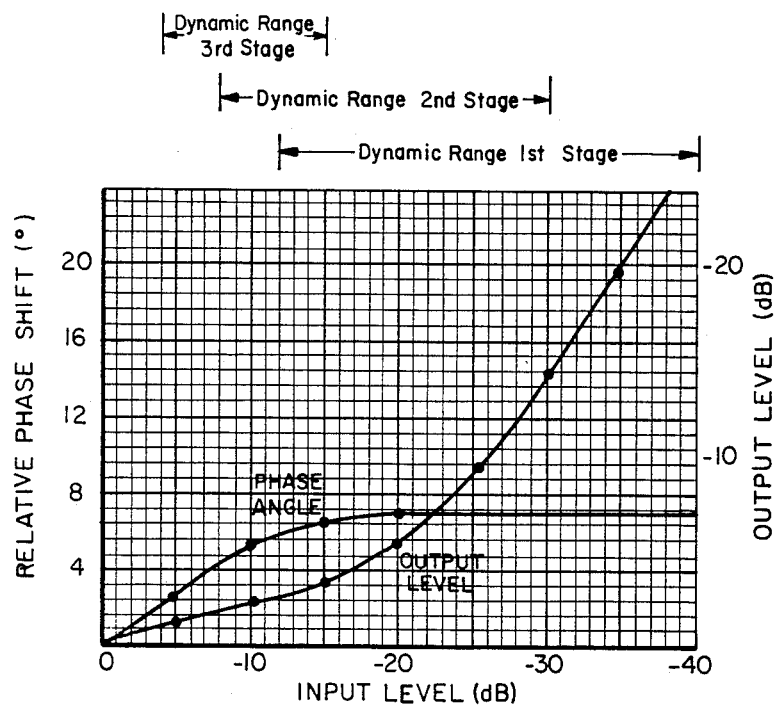
FIG. 3 is a graph which illustrates typical performance characteristics of the limiter of FIG. 2.

If one extrapolates the performance of a single stage limiter from FIG. 3, it will be noted that for a 30 dB change in input level, there will be a corresponding 6 dB change in output level and 14° change in phase. If, on the other hand, three limiters are cascaded with their operating points as shown in FIG. 3, it will be found that for a 30 dB change in input level, there will only be a corresponding 2.5 dB change in output level and a 9° change in phase.

In order to remove any harmonics generated by the limiters, a 45 MHz low pass filter 36 was included in the limiter section input to the multiplier 38. Since a filter exhibits a phase response, a similar filter 42 was required in the other input path to multiplier 38 in order to maintain phase coherency over as wide a bandwidth as possible. In addition, a fixed delay line 44 was added in the other path to compensate for the delay inherent in the limiters.

In order to maintain linear operation over a wide dynamic range, an active four quadrant multiplier using matched transistors and facilities for optimizing the internal currents to minimize any form of distortion was used. The currents were adjusted to minimize the leak through of both the signal from the limiter and its second harmonic. In addition, all AC levels into the multiplier must be kept to less than 100 millivolt peak to peak. In practice, this level was chosen empirically as a compromise between noise and distortion, the two factors limiting the theoretical performance of the multiplier circuit.

As was noted above, a blocking capacitor 48 is incorporated in the output path of the multiplier 38 in order to remove the DC component of the multiplication process. The AC signal is then passed through a bandpass filter which has bandwidth of $\Delta f$ MHz centered at 70 MHz, which is required to minimize fundamental feedthrough and the harmonic distortion introduced by the multiplier. Finally, the signal is additionally conditioned by a group delay equalizer which was necessary to compensate for any group delay contributed by the filters. The output of the equalizer is then amplified in amplifier 54 to a level equal to that going into the up converter. The up converter, as a unit, then has a unity gain while doubling the frequency.

What is claimed is:
1. Apparatus interposed between a standard radio link test set, which is designed to test radio sets having an IF bandwidth $\Delta f$ centered at 70 MHz, and a radio set having an IF bandwidth $\Delta f/2$ centered at 35 MHz, so as to permit testing by the standard radio link test set, which comprises:
    a down converter having an input terminal adapted to receive a 70 MHz sinusoidal test signal from the radio link test set and having an output terminal adapted for connection to the input of the radio set under test, said down converter comprising:
    means to square up the sinusoidal signal from said radio link test set;

means for dividing the squared up signal to obtain a fundamental frequency of 35 MHz;

means for substantially reducing spurious frequencies present after the squaring and dividing of said sinusoidal signal to obtain a relatively harmonic-free 35 MHz test signal; and means for adjusting the level of the test signal as required for the test to be performed to provide an adjusted level test signal at said output terminal; and an up converter having input terminals adapted to receive output test signal from said radio set, and having an output terminal adapted for connection to an input terminal of said radio link test set, said up converter comprising:

means for multiplying said output test signal by itself without squaring the amplitude thereof so as to obtain a fundamental output frequency, $f_o = K'E_2(1+\cos 2\omega t)$, where $K'$ is a constant of proportionality, $E_2$ being the amplitude of the output test signal and $\omega$ being the angular frequency;

means for conditioning the output signal from said multiplying means to substantially remove spurious frequencies and compensate for group delay; and means for adjusting the amplitude of the signal output from said conditioning means to obtain a level equal to that at the up converter input terminals, and applying this level adjusted signal to the input terminal of said radio link test set.

2. Apparatus as set forth in claim 1 wherein said means for squaring up comprises a comparator having one input set at a fixed level and having a sinusoidal test signal applied to the other input.

3. Apparatus as set forth in claim 2 wherein said means for dividing comprises a flip-flop thereby dividing the squared up frequency by 2.

4. Apparatus as set forth in claim 3 wherein said means for substantially reducing spurious frequencies comprises a low-pass filter having a passband below about 45 MHz.

5. Apparatus as set forth in claim 4 wherein said means for adjusting the level comprises:
   a fixed gain amplifier; and
   an attenuator for adjustment of the input level to the radio.

6. Apparatus as set forth in claim 1 wherein said means for multiplying comprises:
   a multiplier having first and second inputs and an output;
   a limiter having an input connected to receive said output signal from said radio set, and having an output, said limiter designed to provide a constant output amplitude over a desired dynamic range, which amplitude is limited so that the amplitude of the output signal is a linear function of said input test signal;
   a first low-pass filter having a cut-off frequency at about 45 MHz interposed between the output of said limiter and the first input terminal of said multiplier;
   a signal compensation circuit interposed between the output of said radio set and said second input of said multiplier, said signal compensation circuit providing necessary delay and phase adjustment to maintain the required relationships between the two multiplier input signals.

7. Apparatus as set forth in claim 6 wherein said means for conditioning comprises:
   a blocking capacitor having one terminal end connected to the output of said multiplier for removing the DC component of the multiplied signal, thereby providing the desired fundamental $f_o = K'E_2 \cos 2\omega t$;
   a bandpass filter designed to have a pass band of $\Delta f$ MHz at a center frequency of 70 MHz, said filter adapted to accept the output from said blocking capacitor; and
   a group delay equalizer to compensate for any group delay contributed by any of the filters.

* * * * *